United States Patent
Marquart et al.

(10) Patent No.: US 9,183,070 B2
(45) Date of Patent: Nov. 10, 2015

(54) RESTING BLOCKS OF MEMORY CELLS IN RESPONSE TO THE BLOCKS BEING DEEMED TO FAIL

(71) Applicant: Micron Technology, Inc., Boise, ID (US)

(72) Inventors: Todd Marquart, Boise, ID (US); Sampath Ratnam, Boise, ID (US); Sean Eilert, Penryn, CA (US)

(73) Assignee: Micron Technology, Inc., Boise, ID (US)

( * ) Notice: Subject to any disclaimer, the term of this patent is extended or adjusted under 35 U.S.C. 154(b) by 114 days.

(21) Appl. No.: 13/949,560

(22) Filed: Jul. 24, 2013

(65) Prior Publication Data

US 2015/0033087 A1 Jan. 29, 2015

(51) Int. Cl.
*G06F 11/07* (2006.01)

(52) U.S. Cl.
CPC .... *G06F 11/0727* (2013.01); *G06F 2212/7204* (2013.01); *G06F 2212/7206* (2013.01); *G06F 2212/7211* (2013.01)

(58) Field of Classification Search
CPC ................ G06F 2212/7211; G06F 2212/7204; G06F 2212/7206; G06F 11/0727; G06F 11/0751–11/076; G06F 11/0703

USPC .......... 714/718, 773, 774, E11.015, E11.144; 711/102, 103, 104
See application file for complete search history.

(56) References Cited

U.S. PATENT DOCUMENTS

| | | | |
|---|---|---|---|
| 8,156,392 B2 | 4/2012 | Flynn et al. | |
| 2009/0168524 A1* | 7/2009 | Golov et al. | 365/185.09 |
| 2010/0064096 A1 | 3/2010 | Weingarten et al. | |
| 2010/0293440 A1* | 11/2010 | Thatcher et al. | 714/764 |
| 2011/0099458 A1 | 4/2011 | Reche et al. | |
| 2011/0252289 A1* | 10/2011 | Patapoutian et al. | 714/763 |
| 2011/0302445 A1 | 12/2011 | Byom et al. | |
| 2012/0023365 A1 | 1/2012 | Byom et al. | |
| 2013/0191700 A1* | 7/2013 | Griffin et al. | 714/759 |
| 2013/0232289 A1* | 9/2013 | Zhong et al. | 711/102 |

\* cited by examiner

*Primary Examiner* — Albert Decady
*Assistant Examiner* — Christian Dorman
(74) *Attorney, Agent, or Firm* — Dicke, Billig & Czaja, PLLC

(57) ABSTRACT

In an embodiment, a block of memory cells is rested in response to the block of memory cells being deemed to fail. For some embodiments, a rested block may be selected for use in response to passing an operation. In other embodiments, a rested block may be rested again or may be permanently retired from further use in response to failing the operation.

30 Claims, 2 Drawing Sheets

RESTING BLOCKS OF MEMORY CELLS IN RESPONSE TO THE BLOCKS BEING DEEMED TO FAIL

FIELD

The present disclosure relates generally to memories, and, in particular, the present disclosure relates to resting blocks of memory cells in response to the blocks being deemed to fail.

BACKGROUND

Memory devices are typically provided as internal, semiconductor, integrated circuits in computers or other electronic devices. There are many different types of memory, including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Non-volatile memory is memory that can retain its data values for some extended period without the application of power. Flash memory devices typically use a one-transistor memory cell that allows for high memory densities, high reliability, and low power consumption. Changes in threshold voltage of the cells, through programming (which is sometimes referred to as writing) of charge-storage structures (e.g., floating gates or charge traps) or other physical phenomena (e.g., phase change or polarization), determine the data value of each cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory device is a common type of flash memory device, so called for the logical form in which the basic memory cell configuration is arranged. Typically, the array of memory cells for NAND flash memory devices is arranged such that the control gate of each memory cell of a row of the array is connected together to form an access line, such as a word line. Columns of the array include strings (often termed NAND strings) of memory cells connected together in series, source to drain, between a pair of select transistors, such as a source select transistor and a drain select transistor.

A "column" refers to a group of memory cells that are commonly coupled to a local data line, such as a local bit line. It does not require any particular orientation or linear relationship, but instead refers to the logical relationship between memory cell and data line. Each source select transistor is connected to a source line, while each drain select transistor is connected to a data line, such as column bit line.

Memory arrays are sometimes arranged in blocks of memory cells, e.g., where a block may be arranged in rows and columns of memory cells. For example, a block of memory cells may be a plurality of memory cells (e.g., a plurality of NAND strings) that may be erased at once. For example, such blocks may be referred to as erase blocks. Blocks may include error correcting code (ECC) data that is used by ECC techniques to detect errors and correct errors, e.g., by recovering data, when the blocks are being read.

Blocks are susceptible to failure, i.e., a failure to meet some performance criteria or exceeding some performance limit, such as error correcting code (ECC) failures (e.g. where the ECC cannot recover data or where a number of detected ECC errors exceeds a certain value), erase failures (e.g., where the block cannot be erased in a certain number of erase-verify cycles), program failures (e.g., where the block cannot be programmed in a certain number of program-verify cycles), etc., and may be permanently retired from use at the first occurrence of such a failure. However, such failures are sometimes erratic and retirement schemes that permanently retire blocks at the first occurrence of such a failure can lead to the premature permanent retirement of those blocks.

For the reasons stated above, and for other reasons stated below which will become apparent to those skilled in the art upon reading and understanding the present specification, there is a need in the art for alternatives to existing block retirement schemes.

DETAILED DESCRIPTION

Figure 1:
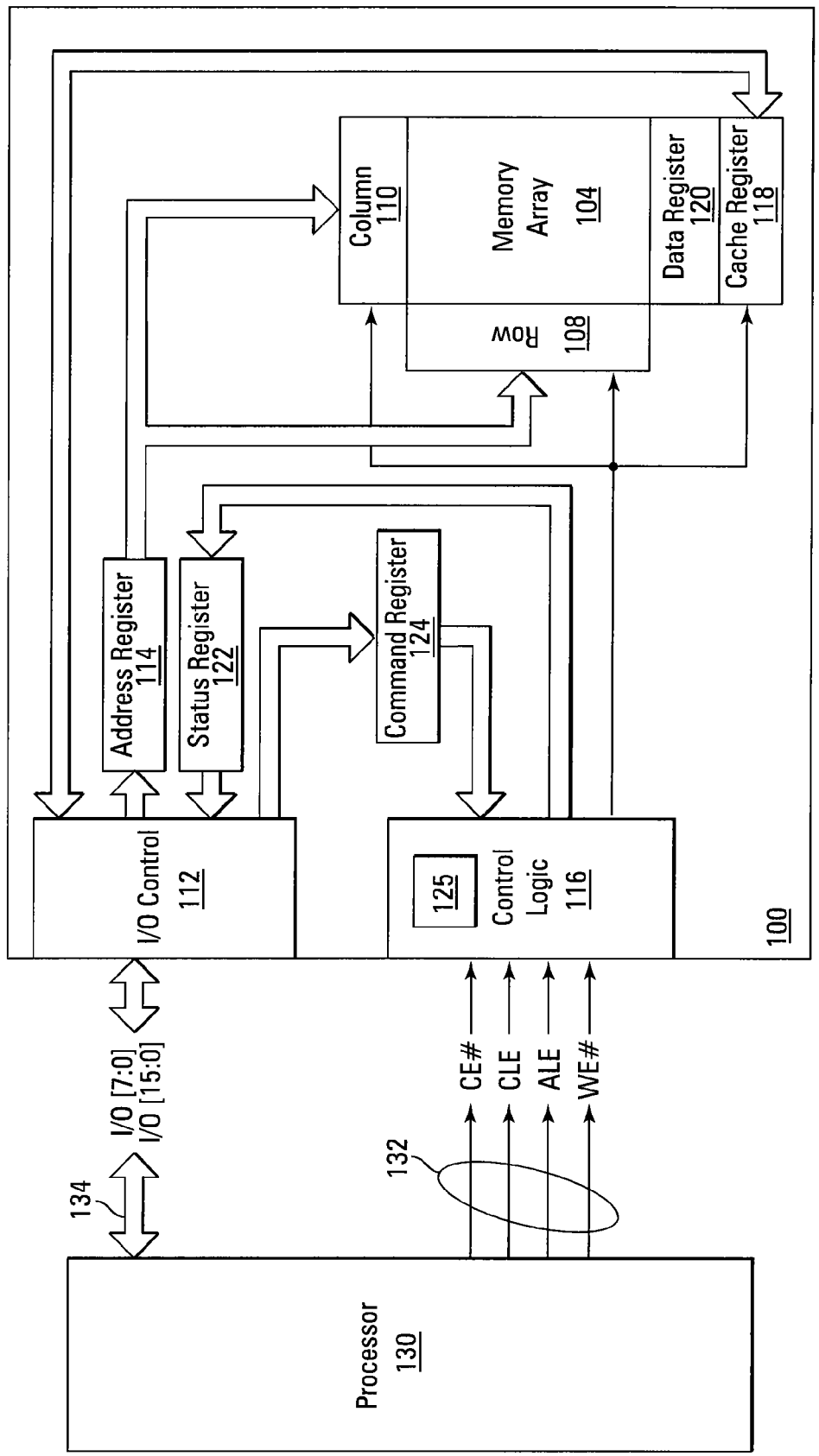
FIG. 1 is a simplified block diagram of a memory system, according to an embodiment.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

FIG. 1 is a simplified block diagram of a NAND flash memory device 100 in communication with a processor 130 as part of an electronic system, according to an embodiment. The processor 130 may be a memory controller or other external host device.

Memory device 100 includes a memory array 104 having memory cells, such as blocks of memory cells. A row decoder 108 and a column decoder 110 are provided to decode address signals. Address signals are received and decoded to access memory array 104.

Memory device 100 also includes input/output (I/O) control circuitry 112 to manage input of commands, addresses, and data to the memory device 100 as well as output of data and status information from the memory device 100. An address register 114 is in communication with I/O control circuitry 112, and row decoder 108 and column decoder 110, to latch the address signals prior to decoding. A command register 124 is in communication with I/O control circuitry 112 and a controller, e.g., that may include control logic 116, to latch incoming commands. Control logic 116 controls access to the memory array 104 in response to the commands and generates status information for the external processor 130. The control logic 116 is in communication with row decoder 108 and column decoder 110 to control the row decoder 108 and column decoder 110 in response to the addresses.

A controller can include control logic, such as control logic 116, other circuitry, firmware, software, or the like, whether alone or in combination, and can be an external controller, such as processor 130, (e.g., in a separate die from the memory array, whether wholly or in part) or an internal controller, such as a controller including control logic 116 (e.g., included in a same die as the memory array).

Control logic 116 is also in communication with a cache register 118. Cache register 118 latches data, either incoming or outgoing, as directed by control logic 116 to temporarily store data while the memory array 104 is busy writing or reading, respectively, other data. During a write operation, data is passed from the cache register 118 to data register 120 for transfer to the memory array 104; then new data is latched in the cache register 118 from the I/O control circuitry 112. During a read operation, data is passed from the cache register 118 to the I/O control circuitry 112 for output to the external processor 130; then new data is passed from the data register 120 to the cache register 118. A status register 122 is in communication with I/O control circuitry 112 and control logic 116 to latch the status information for output to the processor 130.

Control logic 116 may be configured to perform the methods disclosed herein. For example, control logic 116 may be configured to rest a block of memory cells, e.g., of memory array 104, in response to the block being deemed to fail. For purposes herein, a block may be deemed to be a failed block if it fails to meet some performance criteria or it exceeds some performance limit. For some embodiments, control logic 116 may be configured to select a rested block for use in response to the block passing an operation, such as a read operation, a write operation, or an erase operation. In other embodiments, a rested block may be rested again or may be permanently retired from further use in response to failing the operation. Resting memory cells can potentially increase the overall lifetime of a memory device beyond the qualification level and can potentially lead to higher total bytes written and lower costs due to the reduced need for over provisioning redundant memory cells.

Memory device 100 receives control signals at control logic 116 from processor 130 over a control link 132. The control signals may include at least a chip enable CE#, a command latch enable CLE, an address latch enable ALE, and a write enable WE#. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands are received over input/output (I/O) pins [7:0] of I/O bus 134 at I/O control circuitry 112 and are written into command register 124. The addresses are received over input/output (I/O) pins [7:0] of bus 134 at I/O control circuitry 112 and are written into address register 114. The data are received over input/output (I/O) pins [7:0] for an 8-bit device or input/output (I/O) pins [15:0] for a 16-bit device at I/O at control circuitry 112 and are written into cache register 118. The data are subsequently written into data register 120 for programming memory array 104. For another embodiment, cache register 118 may be omitted, and the data are written directly into data register 120. Data are also output over input/output (I/O) pins [7:0] for an 8-bit device or input/output (I/O) pins [15:0] for a 16-bit device.

It will be appreciated by those skilled in the art that additional circuitry and signals can be provided, and that the memory device of FIG. 1 has been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins may be used in the various embodiments.

Figure 2:
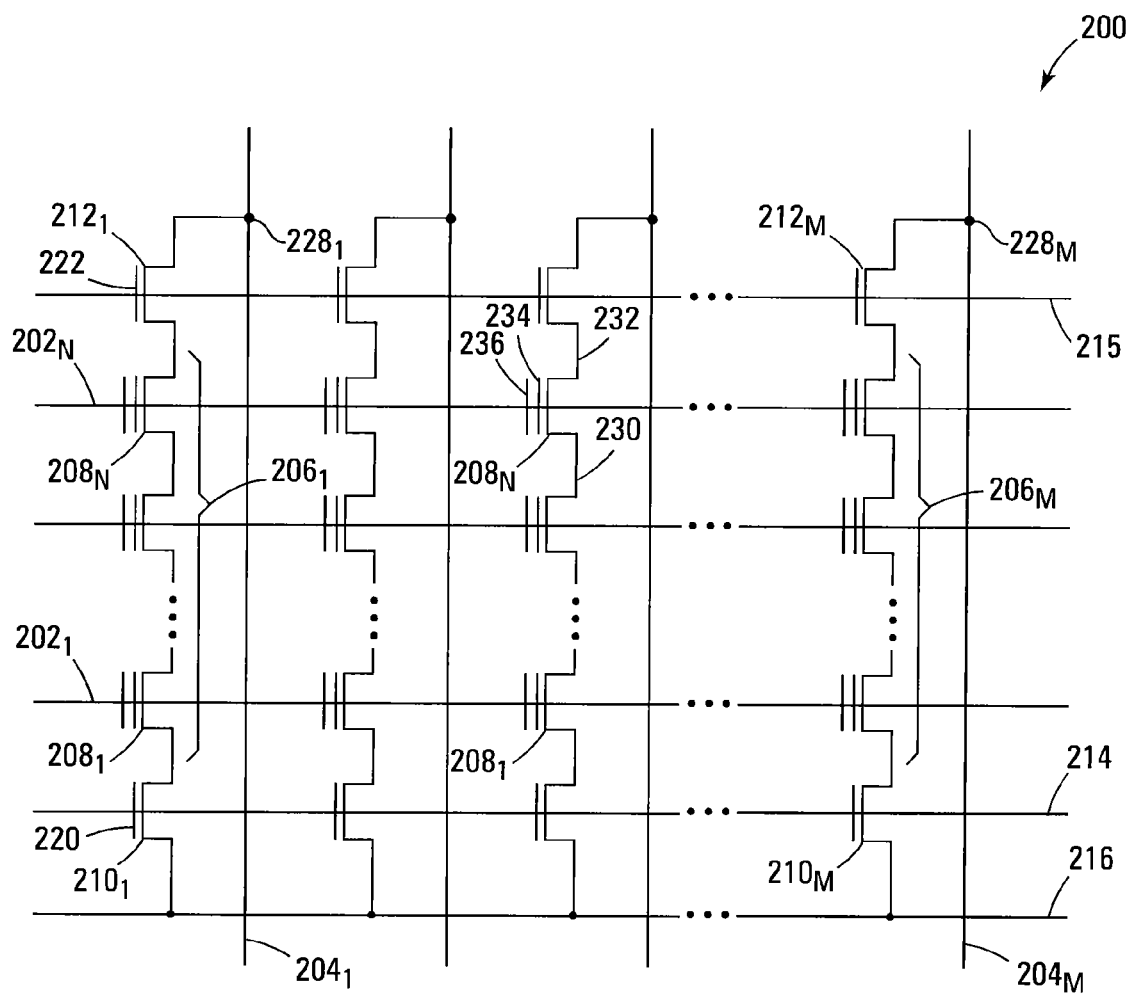
FIG. 2 is a schematic of a NAND memory array, according to another embodiment.

FIG. 2 is a schematic of a memory block (e.g., NAND memory block) 200, e.g., of memory array 104. Memory block 200 includes access lines, such as word lines $202_1$ to $202_N$, and data lines, such as bit lines $204_1$ to $204_M$. The bit lines 204 may be coupled to global data lines, such as global bit lines (not shown), in a many-to-one relationship. For some embodiments, memory block 200 may be formed over a semiconductor that, for example, may be conductively doped to have a conductivity type, such as a p-type conductivity, e.g., to form a p-well, or an n-type conductivity, e.g., to form an n-well.

Memory block 200 is arranged in rows (each corresponding to a word line 202) and columns (each corresponding to a bit line 204). Each column may include a string of series-coupled memory cells, such as one of NAND strings $206_1$ to $206_M$. Each NAND string 206 is coupled to a common source line 216 and includes memory cells $208_1$ to $208_N$. The memory cells 208 represent non-volatile memory cells for storage of data. The memory cells 208 of each NAND string 206 are connected in series, source to drain, between a source select transistor 210 and a drain select transistor 212.

A source of each source select transistor 210 is connected to common source line 216. The drain of each source select transistor 210 is connected to the source of a memory cell $208_1$ of the corresponding NAND string 206. For example, the drain of source select transistor $210_1$ is connected to the source of memory cell $208_1$ of the corresponding NAND string $206_1$. Therefore, each source select transistor 210 selectively couples a corresponding NAND string 206 to common source line 216. A control gate 220 of each source select transistor 210 is connected to source select line 214.

The drain of each drain select transistor 212 is connected to the bit line 204 for the corresponding NAND string at a drain contact 228. For example, the drain of drain select transistor $212_1$ is connected to the bit line $204_1$ for the corresponding NAND string $206_1$ at drain contact $228_1$. The source of each drain select transistor 212 is connected to the drain of a memory cell $208_N$ of the corresponding NAND string 206. For example, the source of drain select transistor $212_1$ is connected to the drain of memory cell $208_N$ of the corresponding NAND string $206_1$. Therefore, each drain select transistor 212 selectively couples a corresponding NAND string 206 to a corresponding bit line 204. A control gate 222 of each drain select transistor 212 is connected to drain select line 215.

Typical construction of memory cells 208 includes a source 230 and a drain 232, a charge-storage structure 234 (e.g., a floating gate, charge trap, etc.) that can store a charge that determines a data value of the memory cell, and a control gate 236, as shown in FIG. 2. Memory cells 208 have their control gates 236 coupled to (and in some cases form) a word line 202. A column of the memory cells 208 is a NAND string 206 coupled to a given bit line 204. A row of the memory cells 208 are those memory cells commonly coupled to a given word line 202.

For some embodiments, memory block 200 (e.g., the memory cells 208 of memory block) may be erased by applying an erase voltage to the channels of memory cells 208, e.g., by applying the erase voltage to the p- or n-well over which memory block 200 is formed while grounding word lines $202_1$ to $202_N$ coupled to the memory cells 208.

As used herein the term "memory block" (e.g., "block") may refer to a plurality of memory cells that may be erased at once. For example, the plurality of memory cells to be erased might include a single string, such as a single NAND string 206. For some embodiments, an erase operation might be performed on a plurality of memory cells prior to programming one or more memory cells of the plurality of memory cells, where the erase and subsequent programming might be referred to as a program/erase operation.

For some embodiments, a plurality of memory cells constituting a block might be located adjacent to (e.g., on) one or more substantially vertical semiconductor pillars. For example, substantially vertical strings (e.g., NAND strings) of series-coupled memory cells may be located adjacent to (e.g., on) substantially vertical semiconductor pillars. Memory arrays having such configurations, for example, may be referred to as three-dimensional memory (e.g., three-dimensional NAND) arrays.

A semiconductor pillar may act as channel region for the plurality of memory cells adjacent thereto. For example, during operation of one or more memory cells of a string, a channel can be formed in the corresponding semiconductor pillar. For some embodiments, the memory cells of a block of three-dimensional memory may be erased by an applying an erase voltage to the semiconductor pillars forming the channels of the plurality of memory cells.

As indicated above, blocks are susceptible to failure, such as error correcting code (ECC) failures, erase failures, program failures, etc., and may be permanently retired from use at the first occurrence of such a failure. Such failures may be related to degradation of the memory cells. For example, such memory-cell degradation may be related to traps in the memory cells, such as in the tunnel dielectric, e.g., between the charge-storage structure and the channel of a memory cell, or other such dielectrics, due to electrons and relatively high electric fields that can be present during program and erase operations.

For example, charge trapping (e.g., electron trapping) can cause memory cells to become more difficult to erase as the number of program/erase operations increase. The charge trapping can cause the erase time (e.g., number of erase-verify cycles) to increase, eventually leading to an erase failure. For example, an erase failure may occur when the number of erase cycles applied to a block reaches a certain value without the block passing an erase verify. Note that applying an erase voltage to the channels of the memory cells in the block followed by applying an erase verify voltage to the access (e.g., word) lines coupled to the memory cells of the block might be referred to as an erase-verify cycle or simply as an erase cycle.

Some failures during read operations, such as ECC failures during a read operation, may also be related to charge trapping. For example, higher charge trapping levels may lead to more ECC errors during read operations. For example, an ECC failure may occur when the number of ECC errors reaches a certain number, when the ECC cannot recover data, or when ECC might need redundancy to recover data.

Trapping-related mechanisms can vary (e.g., can be erratic) from program/erase operation to program/erase operation, e.g., due to changes in trap density and changes in the locations that may impact tunneling currents and memory cell operation. For example, a block might fail an operation, such as an erase operation or an ECC operation during a read operation, and might pass a subsequent operation. This can be due to the traps detrapping charge (e.g., electrons). In some embodiments, the likelihood of a block passing a subsequent operation (e.g., a subsequent erase operation or a subsequent ECC during a subsequent read) may be increased by allowing a block to rest a certain time after an operation fails, in that traps can detrap charge while a block rests.

For some embodiments, control logic 116 may be configured to rest a block in response to receiving an indication that the block failed an operation, such as an erase operation, a program operation, or a read operation, e.g., an ECC operation during the read operation. For example, resting a block may allow charge to be detrapped from regions of the memory cells of the block where the charge is unwanted.

A failure of a block may include the block failing an erase operation, where the block fails to erase in response a certain number erase cycles (e.g., erase voltage pulses) being applied to the block, e.g., the number of erase cycles reaches a certain value without the block is erased. A failure may include the block failing a read operation, e.g., where a number of detected ECC errors reaches a certain number in response to reading the block, where ECC fails to recover data and correct errors, and/or where ECC might need redundancy to recover data. A failure of a block may include the block failing a program operation, such as where one or more memory cells in the block fail to program in a certain time, e.g., where one or more memory cells in the block fail to program in response to a certain number programming pulses being applied to the one or more memory cells in the block. For example, the number of programming pulses may reach a certain value without the one or more memory cells being programmed. Note that applying a programming pulse to the memory cells in the block followed by applying a program verify voltage to the access (e.g., word) lines coupled to the memory cells of the block might be referred to as an program-verify cycle or simply as a program cycle.

For some embodiments, after the block is rested, a determination may be made as to whether the rested block passes the operation. For example, the rested block may be selected for use only when the rested block passes the operation.

The operation may be a read operation, a program operation, or an erase operation. Passing the read operation might include a number of ECC errors during the read operation being less than or equal to the certain number; passing the program operation might include one or more memory cells in the block programming in response to a certain number of programming pulses being applied to the one or more memory cells; or passing an erase operation might include the block erasing in response to a certain number of applied erase cycles.

For some embodiments, after the block is rested, the rested block may be tested to determine whether it fails. The test may be performed immediately after resting the block before allowing the rested block to be used for some embodiments. The test may include the same operation that the block failed before the test, e.g., the same operation that failure of which caused the block to be rested before the test.

For example, the rested block may be designated as being useable, e.g., useable for storing data, in response to the test determining that the block does not fail. However, the rested block may be designated as being un-useable in response to the test determining that the rested block fails. For example, being selected for use may refer to as being selected for data storage, e.g., selected for programming. For example, a block designated as un-useable will not be selected (e.g., will be passed over) for data storage, e.g., for programming.

For some embodiments, a rested block designated as being un-useable might be rested again in response to the rested block failing the test. For example, the block might be rested again in response to being designated as being un-useable. Resting the block again might include resting the block for a longer time duration than resting the block during a preceding rest. For example, a block might be rested for a longer time duration when the block is designated as being un-useable than resting the block during a preceding rest. For other embodiments, resting the block again might include heating or applying an electric field to the block, whereas a preceding rest might include only resting the block. For example, a block may be heated or an electric field may be applied to the block while the block is rested when the block is designated as being un-useable and the block may only be rested during a preceding rest.

For some embodiments, the test may include determining a number of ECC errors during a read operation, determining whether the block erases in response to a certain number of applied erase cycles, or determining whether one or more memory cells in the block program in a certain time, e.g., one or more memory cells in the block program in response to a certain number of programming pulses being applied to the one or more memory cells. The block may fail the test when the number of ECC errors during the read operation exceeds a certain number, when the block does not erase in response to the certain number of applied erase cycles, or when the one or more memory cells in the block do not program in response to the certain number of programming pulses being applied to the one or more memory cells. The block may pass the test when the number of ECC errors during the read operation is less than or equal to the certain number, when the block erases in response to the certain number of applied erase cycles, or when the one or more memory cells in the block program in response to the certain number of programming pulses being applied to the one or more memory cells.

For some embodiments, the block may be permanently retired from further use in response to a certain number of failures, e.g., in response to failing a certain number of operations, e.g., in response to failing a certain number of read operations, a certain number of erase operations, or a certain number of program operations. For example, failing a read operation might include a number of ECC errors exceeding a certain number during the read operation; failing an erase operation might include a block failing to erase in response a certain number erase cycles; and failing a program operation might include the block failing to program in a certain time.

For other embodiments, when a block is designated as un-useable after being rested and tested, the block might be permanently retired from further use. For example, a block might be permanently retired from further use in response to the block being designated as un-useable a particular number of times, e.g., after being designated as un-useable a second time.

As used herein, retiring a block from use differs from resting a block, in that retiring a block from use means that no further operations, such as program, read, or erase operations, will be performed on the block, whereas resting the block means that further operations may be performed on the block after the block has rested. For example, resting a block may refer to temporarily removing the block from use, whereas retiring a block may refer to permanently removing the block from use. For some embodiments, each time a block is rested, the block, may be rested in one or more of the manners (e.g., ways) described below.

For some embodiments, a block may be rested (or rested again) by including it in a scheme, such as a wear-leveling scheme, where the order in which blocks are selected is based on a count of the number of program/erase operations performed on the blocks, e.g., with blocks having lower counts blocks being selected before blocks having higher counts. For example, the block to be rested (or rested again) may be grouped with (e.g., placed in a pool of) blocks that are not being used and where the blocks are selected from the group for use based on the count of the number of program/erase operations performed on the blocks. For example, blocks with lower counts may be selected for use, e.g., for storing data (e.g., for programming) before those with higher counts.

Therefore, for some embodiments, an artificially high count may be assigned to a block that is selected for resting, e.g., in response to failing an operation, so that the count is higher than the count for other blocks in the group, thereby ensuring that the block selected for resting is selected for use after the other blocks in the group are selected for use. As such, the wear-leveling scheme could avoid using the rested block until counts for the remaining blocks reach the artificially high count of the rested block. For example, the artificially high count assigned to a block that is selected for resting may be different than (e.g., greater than) the number of program/erase operations actually performed on the block selected for resting. Note that the group may include blocks that are participating in the wear-leveling scheme and blocks that have failed and are resting. For some embodiments, blocks in the group that have failed and are resting may be assigned counts according to the number of times they have failed, with the count increasing as the number of failures increases. In this manner, longer rest periods could be attained with increasing numbers of failures.

For some embodiments, the test may be performed on the block after it is selected based on the count assigned to it. For example, such a block may be marked for testing before it is placed in the group.

Note that the duration of a rest (e.g., of a rest period) might not be preselected for some embodiments. For example, the duration of a rest period, e.g., the length of time a block may be rested, may depend on the rate at which the blocks in the group are selected, e.g., the rate at which the memory device is being programmed. Alternatively, a block that is selected for resting may be designated to be used only when there are no other blocks available for use, e.g., only after all other available blocks have been used. For example, the duration of the rest period may again depend on the rate at which the memory device is being programmed.

For some embodiments, resting a block may involve designating the block as a low-priority block, regarding the selection for use of that block, in response to failure of the block. Assigning a count of the number of program/erase operations to a block that has failed so it is selected for use last is an example of designating a block as a low-priority block. Selecting a block that is selected for resting only when there are no other blocks available is another example of designating a block as a low-priority block. For example, a block may be assigned a lower priority in response to that block failing than other blocks that have not failed.

For some embodiments, where there is more than one failed block, these blocks may prioritized, for selection for use, based on their number of failures. For example, a block having more failures may be assigned a lower priority than a block having fewer failures, where the higher-priority block is selected for use before the lower-priority block.

For some embodiments, a block may be rested for a certain time, e.g., where a value corresponding to the certain time may be stored in a register, such as a register 125 of control logic 116 (FIG. 1). For example, the rest period may correspond to the certain time, and may be a constant, e.g., independent of the rate at which the memory device is being programmed.

Alternatively, control logic 116 may be configured to adjust a length of time a block is rested (e.g., the duration of the rest period) based on the number of times a block has failed. For example, a block may fail immediately after resting and may be rested again, e.g., for a longer rest period. For example, a block that fails the test performed immediately after resting, may be rested again, e.g., for a longer rest period. For some embodiments, the block may be retired in response to a block failing immediately after resting.

For some embodiments, where a block may be heated to produce a temperature field and/or where a voltage may be applied to the control gates of the memory cells of the block to produce an electric field, the temperature field and/or the electric field may act to drive charge (e.g., electrons) from regions of the memory cell where the charge is unwanted, e.g., from the tunnel dielectric, to the charge storage structures or the channels of the memory cells.

Note that a block may be heated and/or a voltage may be applied to the control gates of the memory cells while the block is resting and may act to reduce the rest period. For example, the heating and voltage application may be referred to as acceleration techniques. For other embodiments, an acceleration technique may be employed in response to a block failing immediately after resting or in response to a block failing a certain number of times, e.g., in response to a certain number of fail-rest cycles. For example, a fail-rest cycle might include detecting the failure and the subsequent resting of block (e.g., subsequent rest period).

After a block is rested, it might be returned to normal usage, e.g., it might be treated as any other block that has not failed and might be used to store any type of data. For example, the block may be designated as a standard block. Alternatively, a block may be given a certain designation after it has rested.

For some embodiments, the block may be designated to store a different type of data after resting than before resting. For example, the block may be designated to store less sensitive data, such data being less sensitive to trapping issues, after resting than before resting and/or data that is expected to involve fewer program/erase operations after resting than data stored before resting.

A block may originally be programmed so that each of its memory cells operates as a multilevel memory cell that has multiple data states, and thus may store two or more bits. After resting, each of the memory cells of the block may be programmed to operate as a single-level memory cell, and thus may store a single bit.

For some embodiments, a different ECC scheme might be used for a block after the block has rested than before the block has rested. For example, a block may store more ECC data after it is rested than before it is rested, and/or a more powerful ECC technique might be used for the block after the block has rested than before the block has rested.

For some embodiments, a block may be permanently retired from use in response to a certain number of failures. For example, a block may be retired in response to failing a certain number times without passing. For example, control logic 116 may be configured to permanently retire a block from use in response to a time between failures being less than a certain value, e.g., in response to a frequency of failures of the block exceeding a certain value.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A method of operating a memory device, comprising:
    determining whether a set of memory cells, comprising one or more memory cells, in a block of memory cells fails to program in response to a certain number of programming pulses being applied to the set of memory cells in the block of memory cells or whether the block of memory cells fails to erase in response to a certain number of erase pulses being applied to the block of memory cells;
    resting the block of memory cells in response to determining that the set of memory cells in the block of memory cells fails to program in response to the certain number of programming pulses being applied to the set of memory cells in the block of memory cells or that the block of memory cells fails to erase in response to the certain number of erase pulses being applied to the block of memory cells; and
    when the block of memory cells is rested in response to determining that the set of memory cells in the block of memory cells fails to program in response to the certain number of programming pulses being applied to the set of memory cells in the block of memory cells, selecting the block of memory cells for use in response to determining that the set of memory cells in the block of memory cells programs in response to the certain number of programming pulses being applied to the set of memory cells in the block of memory cells after resting the block of memory cells, or when the block of memory cells is rested in response to determining that the block of memory cells fails to erase in response to the certain number of erase pulses being applied to the block of memory cells, selecting the block of memory cells for use in response to determining that the block of memory cells erases in response to the certain number of erase pulses being applied to the block of memory cells after resting the block of memory cells.

2. The method of claim 1, wherein resting the block of memory cells comprises resting the block of memory cells for a constant period of time.

3. The method of claim 1, further comprising heating the block during resting.

4. The method of claim 1, further comprising applying an electric field to the block during resting.

5. The method of claim 1, further comprising programming memory cells in the block differently after resting than before resting.

6. The method of claim 5, wherein programming the memory cells in the block differently after resting than before resting comprises programming the memory cells in the block as single-level cells after resting and as multilevel cells before resting.

7. The method of claim 1, further comprising using a different error correction code technique after resting than before resting.

8. The method of claim 1, further comprising storing a different type of data in the block of memory cells after resting than before resting.

9. The method of claim 1, further comprising storing data in the block of memory cells that is expected to involve fewer program/erase operations after resting than before resting.

10. The method of claim 1, wherein a length of time that the block is rested does not depend on a rate at which the memory device is being programmed.

11. The method of claim 1, further comprising determining that the block of memory cells is deemed to fail in response to determining that the set of memory cells in the block of memory cells fails to program in response to the certain number of programming pulses being applied to the set of memory cells or that the block of memory cells fails to erase in response to the certain number of erase pulses being applied to the block of memory cells, and permanently retiring the block of memory cells from further use in response to the block being deemed to fail a certain number of times.

12. A method of operating a memory device, comprising:
resting a block of memory cells in response to a set of memory cells, comprising one or more memory cells, in the block failing to program in response to a certain number of programming pulses being applied to the set of memory cells in the block or in response to the block failing to erase in response to a certain number of erase pulses being applied to the block;
determining whether the set of memory cells in the block programs in response to the certain number of programming pulses being applied to the set of memory cells in the block after the block is rested or whether the block erases in response to the certain number of erase pulses being applied to the block after the block is rested; and
when the block is rested in response to the set of memory cells in the block failing to program in response to the certain number of programming pulses being applied to the set of memory cells in the block, selecting the block for use in response to determining that the set of memory cells in the block programs in response to the certain number of programming pulses being applied to the set of memory cells in the block after the block is rested, or when the block is rested in response to the block failing to erase in response to the certain number of erase pulses being applied to the block, selecting the block for use in response to determining that the block erases in response to the certain number of erase pulses being applied to the block after the block is rested.

13. The method of claim 12, wherein after the block is rested, the block is a rested block, and further comprising, when the block is rested in response to the set of memory cells in the block failing to program in response to the certain number of programming pulses being applied to the set of memory cells in the block, resting the rested block again in response to determining that the set of memory cells in the rested block fails to program in response to the certain number of programming pulses being applied to the set of memory cells in the rested block, or when the block is rested in response to the block failing to erase in response to the certain number of erase pulses being applied to the block, resting the rested block again in response to determining that the rested block fails to erase in response to the certain number of erase pulses being applied to the rested block.

14. The method of claim 12, further comprising, when the block is rested in response to the set of memory cells in the block failing to program in response to the certain number of programming pulses being applied to the set of memory cells in the block, retiring the block from further use in response to determining that the set of memory cells in the block fails to program in response to the certain number of programming pulses being applied to the set of memory cells in the block after the block is rested, or when the block is rested in response to the block failing to erase in response to the certain number of erase pulses being applied to the block, retiring the block from further use in response to determining that the block fails to erase in response to the certain number of erase pulses being applied to the block after the block is rested.

15. A method of operating a memory device, comprising:
resting a block of memory cells in response to a set of memory cells, comprising one or more memory cells, in the block of memory cells failing to program in response to a certain number of programming pulses being applied to the set of memory cells in the block of memory cells or in response to the block of memory cells failing to erase in response to a certain number of erase pulses being applied to the block of memory cells;
when block of memory cells is rested in response to the set of memory cells in the block of memory cells failing to program in response to the certain number of programming pulses being applied to the set of memory cells in the block of memory cells, testing the block of memory cells after resting the block of memory cells to determine whether the set of memory cells in the block of memory cells programs in response to the certain number of programming pulses being applied to the set of memory cells in the block of memory cells after resting the block of memory cells, or when block of memory cells is rested in response to the block of memory cells failing to erase in response to the certain number of erase pulses being applied to the block of memory cells, testing the block of memory cells after resting the block of memory cells to determine whether the block of memory cells erases in response to the certain number of erase pulses being applied to the block of memory cells after resting the block of memory cells;
when block of memory cells is rested in response to the set of memory cells in the block of memory cells failing to program in response to the certain number of programming pulses being applied to the set of memory cells in the block of memory cells, designating the block of memory cells as being useable in response to the test determining that the set of memory cells in the block of memory cells programs in response to the certain number of programming pulses being applied to the set of memory cells in the block of memory cells after resting the block of memory cells, or when block of memory cells is rested in response to the block of memory cells failing to erase in response to the certain number of erase pulses being applied to the block of memory cells, designating the block of memory cells as being useable in response to the test determining that the block of memory cells erases in response to the certain number of erase pulses being applied to the block of memory cells after resting the block of memory cells; and
when block of memory cells is rested in response to the set of memory cells in the block of memory cells failing to program in response to the certain number of programming pulses being applied to the set of memory cells in the block of memory cells, designating the block as being un-useable in response to the test determining that the set of memory cells in the block of memory cells fails to program in response to the certain number of programming pulses being applied to the set of memory cells in the block of memory cells after resting the block of memory cells, or when block of memory cells is rested in response to the block of memory cells failing to erase in response to the certain number of erase pulses being applied to the block of memory cells, designating the block of memory cells as being un-useable in response to the test determining that the block of memory cells fails to erase in response to the certain number of erase pulses being applied to the block of memory cells after resting the block of memory cells.

16. The method of claim 15, further comprising resting the block again when the block is designated as being un-useable.

17. The method of claim 16, wherein resting the block again when the block is designated as being un-useable comprises, when block of memory cells is rested in response to the set of memory cells in the block of memory cells failing to program in response to the certain number of programming pulses being applied to the set of memory cells in the block of memory cells, resting the block for a different length of time than resting the block in response to the set of memory cells in the block of memory cells failing to program in response to the certain number of programming pulses being applied to the set of memory cells in the block of memory cells, or when block of memory cells is rested in response to the block of memory cells failing to erase in response to the certain number of erase pulses being applied to the block of memory cells, resting the block for a different length of time than resting the block in response to the block of memory cells failing to erase in response to the certain number of erase pulses being applied to the block of memory cells.

18. The method of claim 15, further comprising heating the block and/or applying an electric field to the block when the block is designated as being un-useable.

19. The method of claim 15, further comprising permanently retiring the block from further use when the block is designated as being un-useable.

20. A memory device, comprising:
a memory array comprising blocks of memory cells; and
a controller;
wherein the controller is configured to rest a block of memory cells in response to a set of memory cells, comprising one or more memory cells, in the block of memory cells failing to program in response to a certain number of programming pulses being applied to the set of memory cells in the block of memory cells or in response to the block of memory cells failing to erase in response to a certain number of erase pulses being applied to the block of memory cells; and
wherein when the block of memory cells is rested in response to the set of memory cells in the block of memory cells failing to program in response to the certain number of programming pulses being applied to the set of memory cells in the block of memory cells, the controller is configured to select the block of memory cells for use in response to determining that the set of memory cells in the block of memory cells programs in response to the certain number of programming pulses being applied to the set of memory cells in the block of memory cells after the block of memory cells is rested, or when the block of memory cells is rested in response to the block of memory cells failing to erase in response to the certain number of erase pulses being applied to the block of memory cells, the controller is configured to select the block of memory cells for use in response to determining that the block of memory cells erases in response to the certain number of erase pulses being applied to the block of memory cells after the block of memory cells is rested.

21. The memory device of claim 20, wherein the controller is configured to cause the block to be heated and/or an electric field to be applied to memory cells of the block during resting.

22. The memory device of claim 20, wherein the controller is configured to program the block differently after resting than before resting.

23. The memory device of claim 20, wherein the controller is configured to determine the block of memory cells as being deemed to fail in response to the set of memory cells in the block of memory cells failing to program in response to the certain number of programming pulses being applied to the set of memory cells in the block of memory cells or in response to the block of memory cells failing to erase in response to the certain number of erase pulses being applied to the block of memory cells, wherein the controller is configured to permanently retire the block of memory cells from use in response to the block of memory cells being deemed to fail a certain number of times.

24. The memory device of claim 20, wherein the controller is configured to determine the block of memory cells as being deemed to fail in response to the set of memory cells in the block of memory cells failing to program in response to the certain number of programming pulses being applied to the set of memory cells in the block of memory cells or in response to the block of memory cells failing to erase in response to the certain number of erase pulses being applied to the block of memory cells, wherein the controller is configured to adjust a length of time the block is rested based on a number of times the block has been deemed to fail.

25. A memory device, comprising:
a memory array comprising blocks of memory cells; and
a controller;
wherein the controller is configured to rest a block of memory cells in response to a set of memory cells, comprising one or more memory cells, in the block of memory cells failing to program in response to a certain number of programming pulses being applied to the set of memory cells in the block of memory cells or in response to the block of memory cells failing to erase in response to a certain number of erase pulses being applied to the block of memory cells;
wherein the controller is configured to determine whether the set of memory cells in the block of memory cells programs in response to the certain number of programming pulses being applied to the set of memory cells in the block of memory cells after the block of memory cells is rested or whether the block of memory cells erases in response to the certain number of erase pulses being applied to the block of memory cells after the block of memory cells is rested; and
wherein when the block of memory cells is rested in response to the set of memory cells in the block of memory cells failing to program in response to the certain number of programming pulses being applied to the set of memory cells in the block of memory cells, the controller is configured to select the block of memory cells for use in response to determining that the set of memory cells in the block of memory cells programs in response to the certain number of programming pulses being applied to the set of memory cells in the block of memory cells after the block of memory cells is rested, or when the block of memory cells is rested in response to the block of memory cells failing to erase in response to the certain number of erase pulses being applied to the block of memory cells, the controller is configured to select block of memory cells for use in response to determining that the block of memory cells erases in response to the certain number of erase pulses being applied to the block of memory cells after the block of memory cells is rested.

26. The memory device of claim 25, wherein after the block of memory cells is rested, the block of memory cells is a rested block of memory cells and wherein when the block of memory cells is rested in response to the set of memory cells in the block of memory cells failing to program in response to the certain number of programming pulses being applied to the set of memory cells in the block of memory cells, the controller is configured to rest the rested block of memory cells again in response to determining that the set of memory cells in the rested block of memory cells fails to program in response to the certain number of programming pulses being applied to the set of memory cells in the rested block of memory cells, or when the block of memory cells is rested in response to the block of memory cells failing to erase in response to the certain number of erase pulses being applied to the block of memory cells, the controller is configured to rest the rested block of memory cells again in response to determining that the rested block of memory cells fails to erase in response to the certain number of erase pulses being applied to the rested block of memory cells.

27. The memory device of claim 25, wherein when the block of memory cells is rested in response to the set of memory cells in the block of memory cells failing to program in response to the certain number of programming pulses being applied to the set of memory cells in the block of memory cells, the controller is configured to retire the block of memory cells from further use in response to determining that the set of memory cells in the block of memory cells fails to program in response to the certain number of programming pulses being applied to the set of memory cells in the block of memory cells after the block of memory cells is rested, or when the block of memory cells is rested in response to the block of memory cells failing to erase in response to the certain number of erase pulses being applied to the block of memory cells, the controller is configured to retire the block of memory cells from further use in response to determining that the block of memory cells fails to erase in response to the certain number of erase pulses being applied to the block of memory cells after the block of memory cells is rested.

28. A memory device, comprising:
a memory array comprising blocks of memory cells; and
a controller;
wherein the controller is configured to rest a block of memory cells in response to a set of memory cells, comprising one or more memory cells, in the block of memory cells failing to program in response to a certain number of programming pulses being applied to the set of memory cells in the block of memory cells or in response to the block of memory cells failing to erase in response to a certain number of erase pulses being applied to the block of memory cells;
wherein when block of memory cells is rested in response to the set of memory cells in the block of memory cells failing to program in response to the certain number of programming pulses being applied to the set of memory cells in the block of memory cells, the controller is configured to test the block of memory cells after resting the block of memory cells to determine whether the set of memory cells in the block of memory cells programs in response to the certain number of programming pulses being applied to the set of memory cells in the block of memory cells after resting the block of memory cells, or when block of memory cells is rested in response to the block of memory cells failing to erase in response to the certain number of erase pulses being applied to the block of memory cells, the controller is configured to test the block of memory cells after resting the block of memory cells to determine whether the block of memory cells erases in response to the certain number of erase pulses being applied to the block of memory cells after resting the block of memory cells;
wherein when block of memory cells is rested in response to the set of memory cells in the block of memory cells failing to program in response to the certain number of programming pulses being applied to the set of memory cells in the block of memory cells, the controller is configured to designate the block of memory cells as being useable in response to the test determining that the set of memory cells in the block of memory cells programs in response to the certain number of programming pulses being applied to the set of memory cells in the block of memory cells after resting the block of memory cells, or when block of memory cells is rested in response to the block of memory cells failing to erase in response to the certain number of erase pulses being applied to the block of memory cells, the controller is configured to designate the block of memory cells as being useable in response to the test determining that the block of memory cells erases in response to the certain number of erase pulses being applied to the block of memory cells after resting the block of memory cells; and
wherein when block of memory cells is rested in response to the set of memory cells in the block of memory cells failing to program in response to the certain number of programming pulses being applied to the set of memory cells in the block of memory cells, the controller is configured to designate the block of memory cells as being un-useable in response to the test determining that the set of memory cells in the block of memory cells fails to program in response to the certain number of programming pulses being applied to the set of memory cells in the block of memory cells after resting the block of memory cells, or when block of memory cells is rested in response to the block of memory cells failing to erase in response to the certain number of erase pulses being applied to the block of memory cells, the controller is configured to designate the block of memory cells as being un-useable in response to the test determining that the block of memory cells fails to erase in response to the certain number of erase pulses being applied to the block of memory cells after resting the block of memory cells.

29. The memory device of claim 28, wherein the controller is configured to rest the block of memory cells again in response to the block of memory cells being designated as being un-useable.

30. The memory device of claim 28, wherein the controller is configured to permanently retire the block of memory cells from use in response to the block of memory cells being designated as being un-useable.

* * * * *